United States Patent
Castellani et al.

(10) Patent No.: US 11,649,771 B2
(45) Date of Patent: May 16, 2023

(54) CONTROL SYSTEM AND METHOD FOR MANAGING A REVERSE-MODE OPERATION IN A GAS TURBINE ENGINE

(71) Applicant: GE Avio S.r.l., Rivalta di Torino (IT)

(72) Inventors: Simone Castellani, Lubeck (DE); Pierpaolo Forte, Wichita, KS (US)

(73) Assignee: GE Avio S.R.L., Rivalta di Torino (IT)

( * ) Notice: Subject to any disclaimer, the term of this patent is extended or adjusted under 35 U.S.C. 154(b) by 943 days.

(21) Appl. No.: 16/479,801

(22) PCT Filed: Jan. 19, 2018

(86) PCT No.: PCT/EP2018/051364
§ 371 (c)(1),
(2) Date: Jul. 22, 2019

(87) PCT Pub. No.: WO2018/134379
PCT Pub. Date: Jul. 26, 2018

(65) Prior Publication Data
US 2021/0215106 A1    Jul. 15, 2021

(30) Foreign Application Priority Data
Jan. 20, 2017  (EP) .................................. 17425004

(51) Int. Cl.
*F02C 9/58* (2006.01)
*B64C 19/00* (2006.01)

(52) U.S. Cl.
CPC ................ *F02C 9/58* (2013.01); *B64C 19/00* (2013.01); *F05D 2220/323* (2013.01); *F05D 2270/021* (2013.01)

(58) Field of Classification Search
CPC ..... F02C 9/58; B64D 31/06; F05D 2270/051; F05D 2270/053
See application file for complete search history.

(56) References Cited

U.S. PATENT DOCUMENTS 4,958,289 A * 9/1990 Sum .................. B64C 11/305
                                                      701/99
5,416,699 A   5/1995 DiValentin et al.
(Continued)

FOREIGN PATENT DOCUMENTS

EP         1787906 A2    5/2007
WO    WO2015/053930 A1   4/2015

OTHER PUBLICATIONS

European Search Report Corresponding to EP174250043 dated Jul. 6, 2017.
(Continued)

*Primary Examiner* — Arun Goyal
*Assistant Examiner* — William L Breazeal
(74) *Attorney, Agent, or Firm* — Fitch, Even, Tabin & Flannery LLP

(57) ABSTRACT

A control system (10) for a gas turbine engine (1) having a gas generator (4) and a turbine (6) driven by the gas generator (4), is provided with: a control unit (12) to control a forward operating mode or a reverse operating mode of the gas turbine engine (1); and a supervising unit (14), operatively coupled to the control unit (12), to receive an input signal (PLA) indicative of a forward, or reverse, power request and to cause the control unit (12) to control the forward, or reverse, operating mode based on the input signal (PLA). The supervising unit (14) has an enabling stage (20) to enable a transition between the forward and reverse operating modes based on a check that a safety condition is satisfied.

20 Claims, 3 Drawing Sheets

(56) References Cited

U.S. PATENT DOCUMENTS

2007/0110577 A1 5/2007 Danielson
2016/0229547 A1 8/2016 Fisher et al.

OTHER PUBLICATIONS

PCT International Search Report Corresponding to PCT/EP2018/051364 dated Mar. 28, 2018.

\* cited by examiner

Time [s]

US 11,649,771 B2

CONTROL SYSTEM AND METHOD FOR MANAGING A REVERSE-MODE OPERATION IN A GAS TURBINE ENGINE

PRIORITY CLAIM

This application claims priority from European Patent Application No. 17425004.3 filed on Jan. 20, 2017, the disclosure of which is incorporated by reference.

TECHNICAL FIELD

The present solution relates to a control system and method for managing a reverse-mode operation in a gas turbine engine, in particular for an aircraft.

BACKGROUND ART

As it is known and as schematically shown in FIG. 1, a gas turbine engine 1, in particular for an aircraft, generally comprises:

an axial/centrifugal compressor 2, coupled to an air intake 3;

a high-pressure turbine, so called "gas generator" 4, coupled to the axial/centrifugal compressor 2 via a compressor shaft 5;

a low-pressure turbine, so called "power turbine" 6, driven by, and mechanically decoupled from, the gas generator 4; and a propeller 7, coupled to the power turbine 6 via a power shaft 8 and a suitable gearing 9.

The gas turbine engine 1 is managed by an automatic electronic control system 10, that includes an electronic control unit (e.g. a microprocessor, a microcontroller, or similar electronic processing unit) provided with a non-volatile memory storing suitable software instructions, in order to implement an engine control strategy to meet an input power demand (e.g. originated from a pilot's power lever).

In particular, it is known that engine operation generally envisages a forward-mode operation, when the pilot's power lever is above an idle position, and a reverse-mode operation, when the pilot's power lever is below an idle position (the idle position representing a zero-angle position for the same lever).

The present Applicant has realized that known control systems, although generally providing satisfying results, are not able to deal properly with transitions between the forward and reverse operating modes, in particular with transitions from full forward to full reverse operation.

DISCLOSURE OF INVENTION

The aim of the present solution is to provide an improved control of the gas turbine engine, in particular for properly managing a reverse-mode operation thereof.

According to the present solution, a control system and method are therefore provided, as defined in the appended claims.

BRIEF DESCRIPTION OF THE DRAWINGS

For a better understanding of the present invention, preferred embodiments thereof are now described, purely as non-limiting examples, with reference to the attached drawings, wherein.

BEST MODE FOR CARRYING OUT THE INVENTION

The present solution originates from the Applicant's realization that during manoeuvers such as the so called "aborted take off", when the pilot suddenly demands full reverse from high forward power, or "missed landing after touch down", when the pilot takes off power from full reverse, or in general when the pilot suddenly moves the pilot's lever from a forward position to a reverse position, there is a high risk to bring the engine propeller in a overspeed condition.

Indeed, when such transitions are commanded, the propeller's pitch crosses the blades flat position (pitch angle≈0°), with minimum propeller torque resistance, while the gas generator is still delivering high thermodynamic power because of its inertia.

Figure 1:
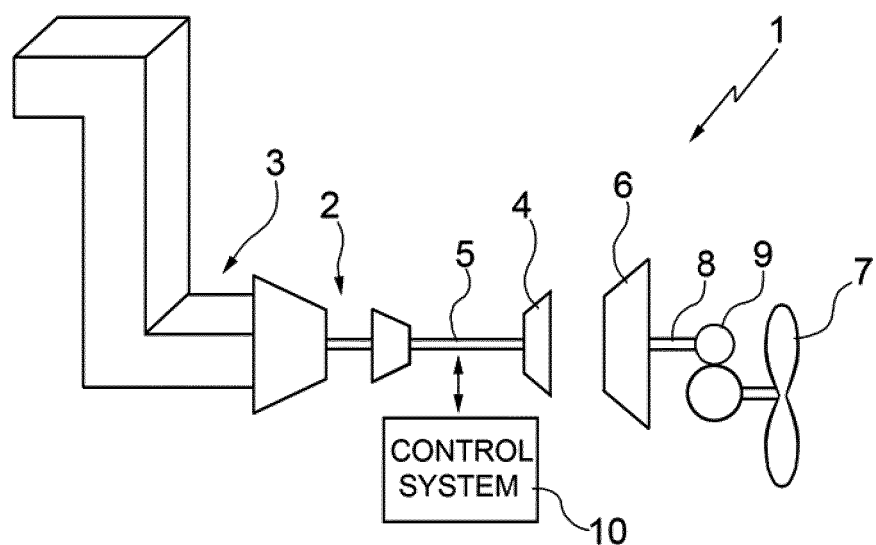
FIG. 1 is a schematic diagram of a gas turbine engine, of a known type.
Figure 2:
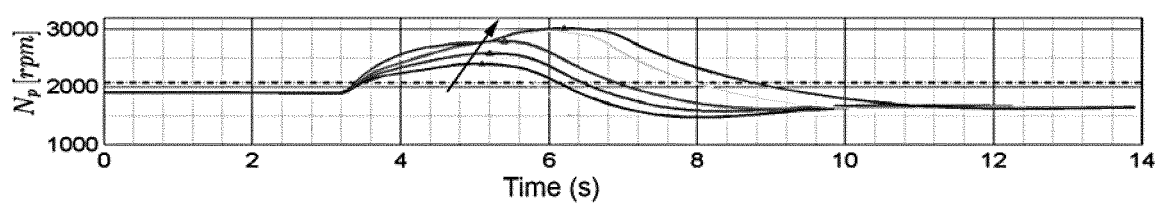
FIGS. 2 and 3 show plots related to operation of the gas turbine engine, according to a known control solution.

In this respect, FIG. 2 shows the plot of the propeller speed $N_p$ versus time, when the pilot requests (at time 3.5 s in the exemplary plot) transition from forward to full reverse operation, considering different altitude operating values (the arrow indicating a progressive increase in the altitude level).

The propeller overspeed condition is evident, after the pilot's command, with the propeller speed $N_p$ exceeding a target operating value (shown with the dashed line in FIG. 2, at about 2000 rpm in the example); in particular, the higher is the altitude, the higher is the propeller overspeed amount.

Propeller overspeed may lead to damage and faults, or may eventually result in fuel cut-off or engine shutdown, as a consequence of engine overspeed protection system intervention. Indeed, the engine control system may command a shut down, and shutting down the engine during such operating conditions may lead to high-risk events, such as the aircraft exiting the runway.

In order to avoid such events, a known solution requires the pilot to take proper actions, while executing the above manoeuvers, in order to avoid the propeller entering the overspeed condition.

In particular, the pilot is instructed not to move the lever directly from a full-forward to a full-reverse position, but to divide the movement into three phases:

a first phase, with the lever shifted from full forward to idle;

a second phase, with the lever maintained at idle; and a third phase, with the lever shifted from idle to full reverse.

Waiting at idle before commanding the reverse operation may allow a reduction of the gas generator power, before the reverse operation is commanded.

This known solution has, however, a number of drawbacks.

A high workload is indeed requested from the pilot, who has to consider the propeller speed condition, while performing difficult and risky operations, such as the above mentioned "aborted take off" and "missed landing" operations.

Moreover, even if the pilot waits at idle before commanding the transition from the forward to the reverse operating mode, the wait time may not be sufficient to avoid propeller overspeed.

Figure 3:
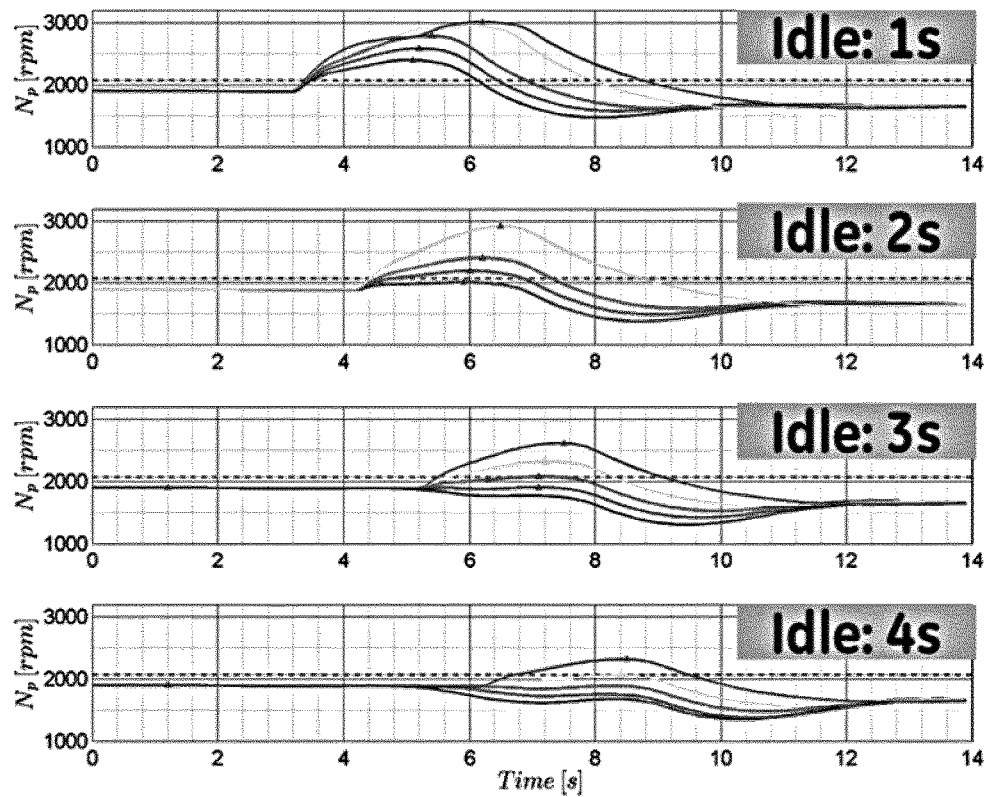

In this regard, FIG. 3 shows different plots of the propeller speed $N_p$ (again at different altitude values, as for the plots of FIG. 2), considering different lengths of a wait time at the lever's idle position (from 1 to 4 seconds); these plots are the results of simulations performed by the Applicant.

As is clear from these plots, also considering the different possible altitude values, the variable waiting time decided by the pilot in general may not guarantee to avoid the occurrence of propeller overspeed, with a consequent high risk of damage to the gas turbine engine and the aircraft.

Moreover, the waiting time commanded by the pilot may even be too long, depending on the altitude value and other engine operating conditions, and this could result in a non-proper execution of the desired aircraft manoeuver (such as the above mentioned "aborted take off" and "missed landing" operations).

An aspect of the present solution therefore envisages reducing the pilot's workload in preventing the propeller overspeed event to occur, by means of an automatic propeller overspeed protection implemented by the engine control system when the pilot requests a transition between the forward and reverse operating modes, e.g. from full forward to full reverse operation. The propeller transition through the flat pitch region is in this case automatically prevented, until a safety condition is verified, indicating that a safe transition may be performed (i.e. avoiding the propeller overspeed).

Figure 4:
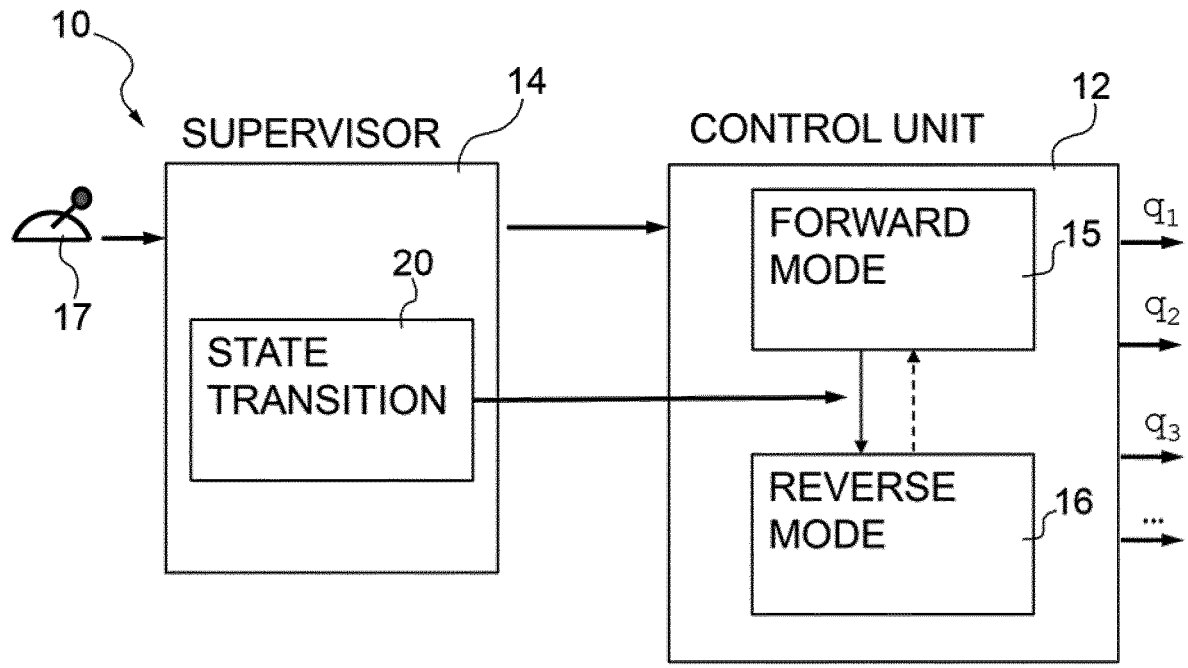
FIG. 4 is a schematic block diagram of a control system of the gas turbine engine according to the present solution.

In more detail, and with reference to FIG. 4, the control system 10 of the gas turbine engine 1 comprises: a control unit 12, configured to perform suitable control algorithms for controlling the engine operation; and a supervising unit 14, operatively coupled to the control unit 12 and configured to supervise its operation.

In particular, the control unit 12 comprises: a forward-mode control stage 15, configured to perform suitable control algorithms to control the gas-turbine engine 1 during forward mode operations; and a reverse-mode control stage 16, configured to perform suitable control algorithms to control the gas-turbine engine 1 during reverse mode operations.

The control system 10 receives measurements of a plurality of engine quantities from sensors (here not shown) coupled to the gas-turbine engine 1, in order to implement the above control algorithms, among which:
gas generator torque Q;
gas generator (or compressor) variable geometry position $V_g$;
core engine speed $N_g$ (i.e. speed of the gas generator 4);
power turbine/propeller speed $N_p$;
compressor inlet temperature $T_2$;
compressor inlet pressure $\delta_2$; and
air speed CAS.

Starting from the core engine speed $N_g$, the control system 10 moreover determines a corrected core engine speed $N_{gr}$, according to the following expression:

$$N_{gr} = \frac{N_g}{\sqrt{\theta_2}},$$

where $\theta_2$ is in turn given by:

$$\theta_2 = \frac{T_2}{T_{isa}}$$

with $T_{isa}$ being a standard temperature correction equal to 518.67 rankine (1 rankine=15° C.).

In a known manner, here not discussed in detail, the control algorithms implemented by the forward-mode control stage 15 and the reverse-mode control stage 16 are designed to determine a respective driving quantity (e.g. an electric current) for driving the propeller control unit (driving quantity $q_1$), the fuel metering unit of the gas generator 4 in order to determine a corresponding fuel flow $W_f$ (driving quantity $q_2$), and the gas generator variable geometry (driving quantity $q_3$); further driving quantities may also be provided by the control unit 12.

The supervising unit 14, based on an input signal PLA indicative of an input power request, in particular of the angle, or setting, of the pilot's power lever (shown schematically and denoted with 17), is configured to enable either the forward-mode control stage 15 or the reverse-mode control stage 16, in order to activate the forward-mode or the reverse-mode operation of the gas-turbine engine 1.

According to a particular aspect of the present solution, the supervising unit 14 comprises a state-transition stage 20, configured to control the state transitions between the forward-mode and the reverse-mode operation of the gas-turbine engine 1, in particular from the forward mode to the reverse mode, when the input signal PLA is indicative of the pilot's request to reverse the engine operation.

Figure 5:
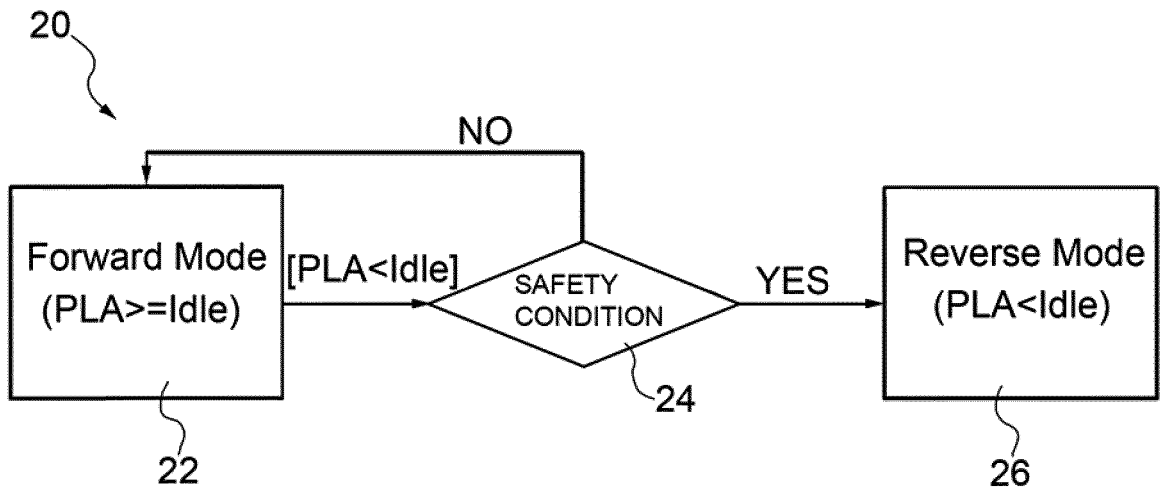
FIG. 5 is a schematic block diagram of a control algorithm implemented in the gas turbine engine control system.

In detail, and with reference to FIG. 5, the state-transition stage 20 is configured to determine, at block 22, a pilot's request to transition from forward power (PLA≥idle) to reverse power (PLA<idle); in other words, the state-transition stage 20, based on the value of the input signal PLA, determines that the pilot has moved the input power lever from the forward position to the reverse position.

After determination of a transition request, the state-transition stage 20 checks, at block 24, if a safety condition is verified, indicating that a safe transition may be performed (i.e. avoiding the propeller overspeed).

In this particular embodiment, the state-transition stage 20 checks if the corrected core engine speed $N_{gr}$ is below a given safety threshold Thr:

$N_{gr}$<Thr.

The safety threshold Thr may be set according to the operating altitude and according to engine operating parameters, such as the compressor inlet temperature $T_2$. For example, the safety threshold Thr may be expressed as a scheduled percentage of the core engine speed $N_{gr}$.

As long as the above safety condition is not satisfied (i.e. as long as $N_{gr}$≥Thr), the state-transition stage 20 maintains the forward-mode operation for the gas-turbine engine 1 (maintaining the forward-mode control stage 15 enabled and disabling the reverse-mode control stage 16).

Only after the safety condition is verified (i.e. $N_{gr}$<Thr), and with the input power lever still in reverse (PLA<idle), the state-transition stage 20 enables, at block 26, the reverse-mode operation for the gas-turbine engine 1 (disabling the forward-mode control stage 15 and enabling the reverse-mode control stage 16).

The state transition stage 20 therefore represents an enabling stage, configured to enable a transition between the forward and reverse operating modes based on the check that the safety condition is satisfied.

According to a further aspect of the present solution, the safety condition checked by the state-transition stage may include additional parameters; for example, transition to the reverse-mode operation may be enabled only after a so-called WOW (Weight On Wheels) condition is verified, meaning that the aircraft's wheels are on the ground.

In any case, thanks to the operation of the state-transition stage 20 in the supervising unit 14, propeller overspeed (or, in general, any other dangerous condition for the gas turbine engine 1) is automatically and reliably prevented, thanks to the fact that the state transition is enabled only after it is determined that the power delivery of the gas generator 4 due to the inertia is decreased below a threshold.

Figure 6:
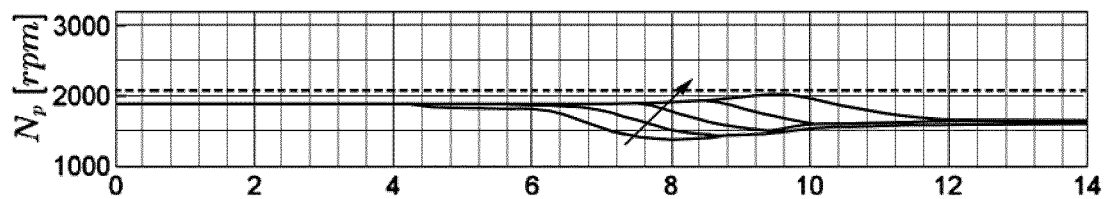
FIG. 6 shows plots related to operation of the gas turbine engine control system of FIG. 4.
Figure 6:
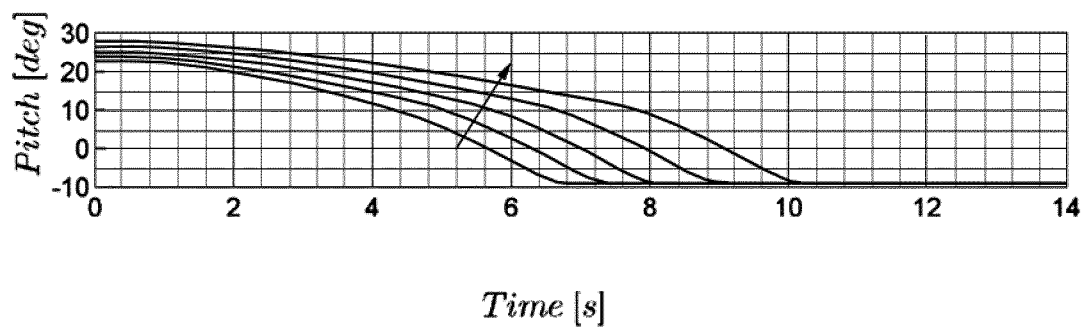

In this respect, FIG. 6 shows plots of the propeller speed $N_p$ (at different altitude values, as for the plots of FIGS. 2 and 3), after a transition request by the pilot; these plots are the results of simulations performed by the Applicant.

As is clear from these plots, even considering different possible altitude values, the occurrence of the propeller overspeed is always avoided (the propeller speed $N_p$ does not exceed the target operating value, again shown with a dashed line), when the propeller's pitch crosses the flat position (pitch angle≈0°).

The advantages of the present solution are clear from the previous discussion.

In particular, it is again underlined that the present solution allows to automatically control the transition between the forward and reverse operation mode of the gas-turbine engine 1, without the pilot's intervention (and therefore without increasing the pilot's workload, particularly during fast transitions request and complex manoeuvers).

Occurrence of the propeller overspeed condition is advantageously avoided, thus avoiding the risk of fuel cut-off and engine shut down.

Finally, it is clear that modifications and variations can be made to what described and illustrated herein, without thereby departing from the scope of the present invention as defined in the appended claims.

In particular, it is underlined that the state-transition stage 20 in the supervising unit 14 of the engine control system 10 may monitor other engine parameters in order to check the safety condition and enable the state transition (in particular from forward to reverse mode), for example the propeller's pitch.

Moreover, it is again underlined that the state-transition stage 20 may advantageously control also the transition from the reverse mode to the forward mode of the engine operation, in addition to the transition from the forward mode to the reverse mode operation, previously discussed in detail.

The invention claimed is:

1. An electronic control system for a gas turbine engine having a gas generator and a turbine driven by the gas generator, comprising:
   a control unit configured to control a forward operating mode or a reverse operating mode of the gas turbine engine; and
   a supervising unit, operatively coupled to the control unit, configured to receive an input signal (PLA) indicative of a forward, or reverse, power request and to cause the control unit to control the forward operating mode, or the reverse operating mode based on the input signal (PLA),
   wherein the supervising unit comprises an enabling stage configured to enable a transition between the forward operating mode and reverse operating mode based on a check that a safety condition is satisfied,
   wherein the gas-turbine engine comprises a compressor coupled to the gas generator, and wherein the check on the safety condition is based on a corrected speed (Ngr) of the gas generator as a function of an altitude and a temperature at an inlet of the compressor.

2. The electronic control system according to claim 1, wherein the control unit has a first stage configured to control the forward operating mode and a second stage configured to control the reverse operating mode of the gas turbine engine, and the supervising unit is configured to enable the first stage, or the second, stage based on the input signal (PLA); wherein the enabling stage is configured to determine, based on the input signal (PLA), a request of transition between the forward operating mode to the reverse operating mode, and to disable the first stage and enable the second stage only upon the check on the safety condition being satisfied.

3. The electronic control system according to claim 1, wherein the safety condition is related to a residual power of the gas generator due to inertia, upon transition between the forward and the reverse operating modes.

4. The electronic control system according to claim 1, wherein the check on the safety condition is based on a speed (Ng) of the gas generator.

5. The electronic control system according to claim 1, wherein the check on the safety condition includes a check if a speed of the gas generator is below a given threshold (Thr).

6. The electronic control system according to claim 5, wherein the threshold (Thr) is a function of the altitude and the temperature at the inlet of the compressor.

7. The electronic control system according to claim 1, for an aircraft, wherein the safety condition further includes a check if wheels of the aircraft are on the ground.

8. A gas turbine engine, comprising the electronic control system according to claim 1.

9. The electronic control system according to claim 1, wherein a propeller transition through a flat pitch region is prevented until the safety condition is verified.

10. The electronic control system according to claim 5, wherein the given threshold (Thr) corresponds to a scheduled percentage of the corrected speed (Ngr) of the gas generator.

11. The electronic control system according to claim 1, wherein the forward operating mode corresponds to the input signal (PLA) being greater than or equal to an idle threshold, wherein the reverse operating mode corresponds to the input signal (PLA) being less than the idle threshold.

12. A control method for a gas turbine engine, having a gas generator and a turbine driven by the gas generator, comprising:
   activating a forward operating mode or a reverse operating mode based on an input signal (PLA) indicative of a forward, or reverse, power request, and
   enabling a transition between the forward operating mode and reverse operating mode based on a check that a safety condition is satisfied,
   wherein the gas-turbine engine comprises a compressor coupled to the gas generator, and wherein the check on the safety condition is based on a corrected speed (Ngr) of the gas generator as a function of an altitude and a temperature at an inlet of the compressor.

13. The control method according to claim 12, wherein enabling comprises determining, based on the input signal (PLA), a request of transition between the forward operating mode to the reverse operating mode, and disabling the forward operating mode and enabling the reverse operating mode only upon the check on the safety condition being satisfied.

14. The control method according to claim 12, wherein the safety condition is associated to a residual power of the gas generator due to inertia, upon transition between the forward operating mode to the reverse operating mode.

15. The control method according to claim 12, wherein the check on the safety condition is based on a speed (Ng) of the gas generator.

16. The control method according to claim 12, wherein the check on the safety condition includes a check if a speed (Ng) of the gas generator is below a given threshold (Thr).

17. The control method according to claim 16, wherein the threshold (Thr) is a function of the altitude and the temperature at the inlet of the compressor.

18. The control system according to claim 12, for an aircraft, wherein the safety condition further includes a check if wheels of the aircraft are on the ground.

19. The control system according to claim 12, further comprising preventing a propeller transition through a flat pitch region until the safety condition is verified.

20. The control system according to claim 16, wherein the given threshold (Thr) corresponds to a scheduled percentage of the corrected speed (Ngr) of the gas generator.

* * * * *

UNITED STATES PATENT AND TRADEMARK OFFICE
CERTIFICATE OF CORRECTION

PATENT NO. : 11,649,771 B2
APPLICATION NO. : 16/479801
DATED : May 16, 2023
INVENTOR(S) : Castellani et al.

It is certified that error appears in the above-identified patent and that said Letters Patent is hereby corrected as shown below:

In the Claims

In Column 6, Claim 2, Line 13, delete "second, stage" and insert -- second stage --, therefor.

In Column 7, Claim 18, Line 18, delete "system" and insert -- method --, therefor.

In Column 7, Claim 19, Line 21, delete "system" and insert -- method --, therefor.

In Column 7, Claim 20, Line 24, delete "system" and insert -- method --, therefor.

Signed and Sealed this
Fifteenth Day of August, 2023

Katherine Kelly Vidal
*Director of the United States Patent and Trademark Office*